(12) United States Patent  
Ariga et al.

(10) Patent No.: US 7,843,603 B2  
(45) Date of Patent: Nov. 30, 2010

(54) IMAGE PROCESSING APPARATUS

(75) Inventors: Norimasa Ariga, Izunokuni (JP); Yoji Matsuda, Mishima (JP); Aiko Okajima, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 516 days.

(21) Appl. No.: 11/874,435

(22) Filed: Oct. 18, 2007

(65) Prior Publication Data

US 2009/0103116 A1 Apr. 23, 2009

(51) Int. Cl.  
*G06F 15/00* (2006.01)

(52) U.S. Cl. .................. 358/1.9; 358/518; 358/523; 358/524; 358/1.16; 345/690

(58) Field of Classification Search .................. 358/1.9, 358/1.16, 518, 523, 524; 345/690  
See application file for complete search history.

(56) References Cited

U.S. PATENT DOCUMENTS

| 6,940,612 | B1 * | 9/2005 | Murai ..................... 358/1.1 |
| 7,170,535 | B2 * | 1/2007 | Matsuda .................. 345/690 |
| 7,557,950 | B2 * | 7/2009 | Hatta et al. .............. 358/1.9 |
| 2003/0048464 | A1 * | 3/2003 | Yamada et al. .......... 358/1.9 |
| 2007/0153307 | A1 * | 7/2007 | Jung ....................... 358/1.9 |
| 2007/0165253 | A1 * | 7/2007 | Usui et al. .............. 358/1.9 |

FOREIGN PATENT DOCUMENTS

JP  2003-110857  4/2003

\* cited by examiner

*Primary Examiner*—Kimberly A Williams  
(74) *Attorney, Agent, or Firm*—Turocy & Watson, LLP

(57) ABSTRACT

When one or both of color conversion data for chromatic colors and color conversion data for achromatic colors are rewritten, attribute information of the color conversion data for chromatic colors or the color conversion data for achromatic colors is updated and this attribute information is displayed on a display.

40 Claims, 4 Drawing Sheets

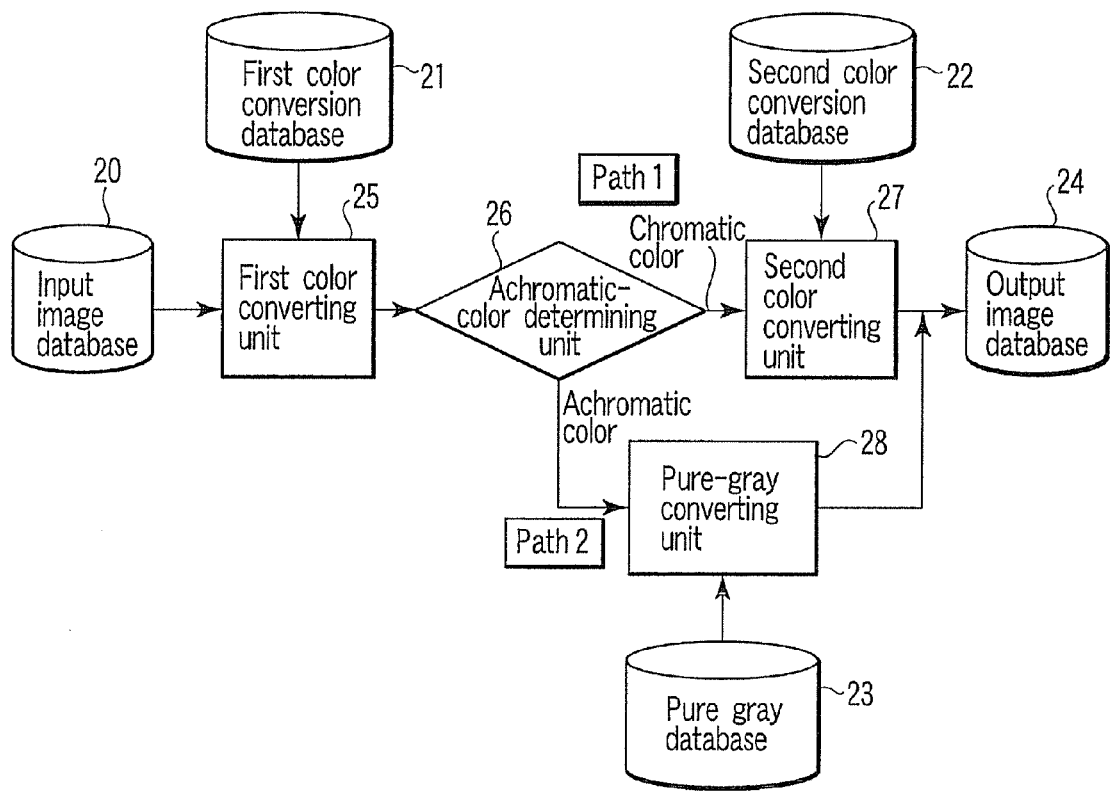
F I G. 3
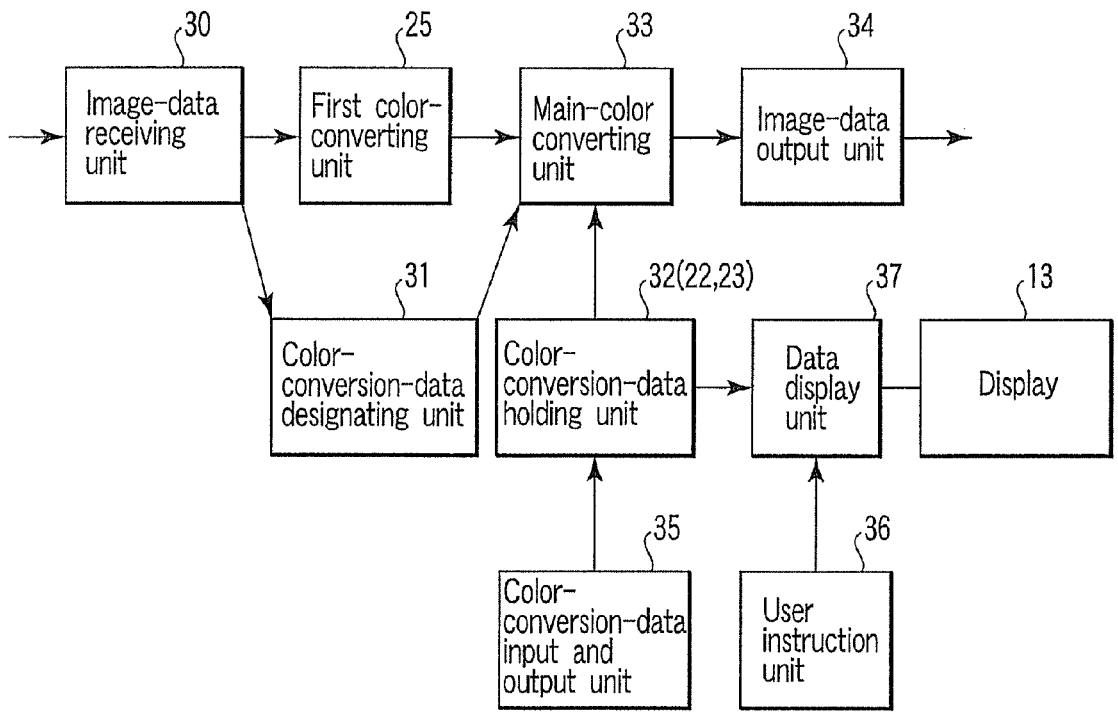
F I G. 4

C = 20%   M = 10%   Y = 10%   K = 30%

C = 20%
M = 10%
Y = 10%
K = 30%

C = 0%   M = 0%   Y = 0%   K = 45%

C = 0%
M = 0%
Y = 0%
K = 45%

IMAGE PROCESSING APPARATUS

BACKGROUND OF THE INVENTION

1. Field of the Invention

The present invention relates to an image processing apparatus such as a color printer that converts, for example, an image signal having red, green, and blue into color information of cyan, magenta, yellow, and black or converts an image signal of an achromatic color into color information of black.

2. Description of the Related Art

A color printer often has two color conversion paths. A first color conversion path uses normal color conversion parameters. The first color conversion path is used when, for example, as print data, an inputted image signal is a chromatic color. The first color conversion path converts, for example, an image signal having red (R), green (G), and blue (B) into, for example, color information corresponding to color materials of the printer, for example, color information of cyan (C), magenta (M), yellow (Y), and black (K).

The first color conversion path holds color conversion data for chromatic colors indicating a relation between an image signal including RGB and color information CMYK represented by color materials. The color conversion data for chromatic colors is stored in a color conversion table for chromatic colors. Therefore, the first color conversion path converts the image signal including RGB into the color information CMYK in accordance with the color conversion table for chromatic colors.

FIG. 7 shows a color conversion result Q1 obtained by the first color conversion path when, for example, an image signal of a character "A" with 50% achromatic colors (R=G=B=50%) is inputted. The color conversion result obtained by the first color conversion path is, for example, C=20%, M=10%, Y=10%, and K=30%. The color conversion result Q1 indicates a ratio for printing the respective colors CMYK with a printer. The printer prints the respective colors CMYK on a print medium such as a print sheet, for example, at a ratio of C=20%, M=10%, Y=10%, and K=30%.

A printing mechanism of the printer usually has some mechanically unstable element. The mechanically unstable element is deviation of print positions of the respective colors CMYK on the print medium. FIG. 8 shows the deviation of the print positions of the respective colors CMYK. Because of the deviation of the print positions of the CMYK colors, in a print result of the character "A", color bleeding occurs in a contour portion of the character "A" and deterioration in an image quality is caused.

On the other hand, a second color conversion path is used when an inputted image signal is an achromatic color. The second color conversion path converts the inputted image signal into, for example, color information of only a K color of the printer.

The second color conversion path holds color conversion data for achromatic colors indicating a relation between an image signal including achromatic colors and color information of a specific color, i.e., the K color. The color conversion data for achromatic colors is stored in a color conversion table for achromatic colors. Therefore, the second color conversion path converts the image signal of achromatic colors into the color information of only the K color in accordance with the color conversion data for achromatic colors.

FIG. 9 shows a color conversion result Q2 obtained by the second color conversion path when, for example, an image signal of a character "A" with 50% achromatic colors (R=G=B=50%) is inputted. The color conversion result Q2 obtained by the second color conversion path is only the K color. Even if deviation occurs in a print position of the K color because of the mechanically unstable element of the printing mechanism of the printer, in the print result of the character "A", as shown in FIG. 10, color bleeding does not occur in a contour portion of the character "A" and deterioration in an image quality is not caused.

When an inputted image signal is an achromatic color, the second color conversion path makes it possible to convert the image signal into, for example, color information of only the K color of the printer without deteriorating an image quality. The second color conversion path is effective only when an inputted image signal is an achromatic color. Therefore, the color printer determines whether an inputted image signal is a chromatic color or an achromatic color. When the image signal is a chromatic color, the color printer uses the first color conversion path. When the image signal is an achromatic color, the color printer uses the second color conversion path.

A user requests a favorite hue and brightness with respect to a print result. The user adjusts the color conversion data for chromatic colors in the first color conversion path in order to obtain a print result of the hue and the brightness corresponding to the request. When the color conversion data for chromatic colors in the first color conversion path is adjusted, it is likely that a large difference occurs between the brightness of a color conversion result obtained by the first color conversion path and the brightness of a color conversion result obtained by the second color conversion path.

For example, the color conversion data for chromatic colors in the first color conversion path is adjusted to obtain bright print result. As a result of this adjustment, a print result becomes bright. The color conversion data for chromatic colors in the first color conversion path and the color conversion data for achromatic colors in the second color conversion path are stored in separate tables. Even if the color conversion data for chromatic colors is adjusted, the color conversion data for achromatic colors is not adjusted. The brightness of the color conversion result obtained by the second color conversion path is left intact and is not adjusted. The brightness of the color conversion result obtained by the second color conversion path is lower than the brightness of the color conversion result obtained by the first color conversion path. In the color conversion result obtained by the second color conversion path, compared with the color conversion result obtained by the first color conversion path, gradation jump occurs and causes deterioration in an image quality.

It is necessary to simultaneously adjust the color conversion data for chromatic colors in the first color conversion path and the color conversion data for achromatic colors in the second color conversion path. It is necessary to manage and adjust the color conversion data for chromatic colors and the color conversion data for achromatic color as a pair.

The color conversion data for chromatic colors is represented by an ICC profile. The color printer has an HDD (Hard Disk Drive) built therein. The color conversion data for chromatic colors is often present in a profile stored in the HDD built in the color printer. The color conversion data for achromatic colors is often present as a profile in an independent format.

The color conversion data for chromatic colors and the color conversion data for achromatic colors are selected on the basis of information incidental to an inputted image signal. The incidental information of the image signal is, for example, a difference in a print medium such as a print sheet, a difference in a halftone, and a difference in a print mode. Therefore, a profile is selected on the basis of the incidental information of the image signal. Optimum color conversion data for chromatic colors or color conversion data for achromatic colors is selected from the selected profile. A profile to be selected is determined in advance in association with the incidental information of the image signal such as a difference in a print medium, a difference in a halftone, and a difference in a print mode. Consequently, selection of a profile corresponding to the incidental information of the inputted image signal is accurately performed.

When contents of pieces of incidental information of image signals inputted, respectively, are identical, the color printer selects an identical profile every time the image signal is inputted. For example, color conversion data for chromatic colors in the profile is adjusted to a hue and brightness corresponding to a request of the user. The adjustment of the color conversion data for chromatic colors in the profile cannot be specified only from a file name. Therefore, it is impossible to determine, with only the file name, what kind of color conversion data for chromatic color the color conversion data for chromatic colors is. To discriminate content of the profile, it is necessary to select the profile and take trouble to print the profile on a print medium. In some cases, it is difficult to distinguish delicate differences in a hue, brightness, and the like on the basis of a print result on the print medium. The print result on the print medium is also different depending on a state of the color printer.

JP-A-2003-110857 discloses that, when print conditions of a print system are changed, a print profile used for color conversion is easily updated. The publication discloses that, when update registration of a print profile is performed by a personal computer of a printing company, a print profile downloaded to a personal computer of a design and production company by a profile management server is automatically updated.

BRIEF SUMMARY OF THE INVENTION

An image processing apparatus according to a main aspect of the present invention includes a color converting unit that holds color conversion data indicating at least a relation between an image signal and color information represented by color materials and converts the image signal into the color information in accordance with the color conversion data, the color conversion data being added with attribute information including information concerning rewriting of the color conversion data, a display, and a color-conversion-data rewriting unit that performs rewriting of the color conversion data, updates the attribute information when the color conversion data is rewritten, reads out the attribute information of the color conversion data, and displays the attribute information on the display.

An image processing apparatus according to another main aspect of the present invention includes an achromatic-color determining unit that determines whether an image signal is a chromatic color having a color or an achromatic color without the color, a chromatic-color-system converting unit that holds color conversion data for chromatic colors indicating a relation between the image signal and color information represented by color materials and converts, when it is determined that the image signal is the chromatic color, the image signal into the color information represented by the color materials in accordance with the color conversion data for chromatic colors, an achromatic-color-system converting unit that holds color conversion data for achromatic colors indicating a relation between the image signal and color information of a specific color and converts, when it is determined that the image signal is the achromatic color, the image signal into the color information of the specific color in accordance with the color conversion data for achromatic colors, the color conversion data for chromatic colors and the color conversion data for achromatic colors being added with pieces of attribute information including information concerning rewriting of the color conversion data, respectively, a display, and a color-conversion-data rewriting unit that performs rewriting of one or both of the color conversion data for chromatic colors and the color conversion data for achromatic colors, updates the attribute information when the color conversion data for chromatic colors or the color conversion data for achromatic colors is rewritten, reads out the attribute information of one or both of the color conversion data for chromatic colors and the color conversion data for achromatic colors, and displays the attribute information on the display.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram showing a flow of image processing by the apparatus;

FIG. 4 is a functional block diagram of the image processing in the apparatus;

DETAILED DESCRIPTION OF THE INVENTION

Figure 1:
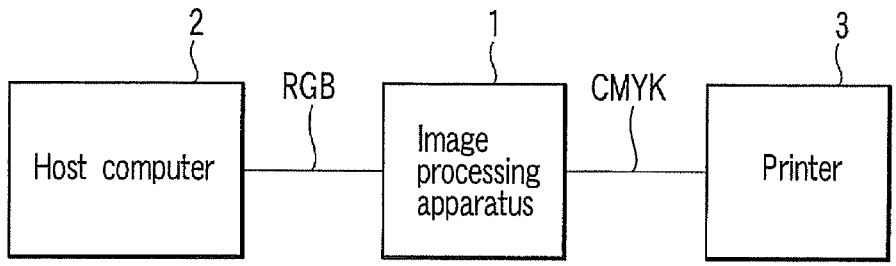
FIG. 1 is an overall diagram showing a printing system employing a first embodiment of an image processing apparatus according to the present invention.

An embodiment of the present invention will be hereinafter explained with reference to the drawings. FIG. 1 shows an overall diagram of a printing system employing an image processing apparatus. An image processing apparatus 1 is connected to a host computer 2. A printer 3 is connected to the image processing apparatus 1. The host computer 2 outputs an image signal of an image in an arbitrary color space for obtaining a desired print output to the image processing apparatus 1. The image signal in an arbitrary color space for obtaining a desired print output is, for example, an image signal of chromatic RGB or an image signal of achromatic colors.

The image processing apparatus 1 receives the image signal of chromatic colors or achromatic colors from the host computer 2 and converts the image signal of chromatic colors or achromatic colors into color material quantities for output by the printer 3. The image processing apparatus 1 converts, for example, an image signal of chromatic RGB into color information in a CMYK color space. The image processing apparatus 1 converts, for example, an image signal of achromatic RGB into color information of a K color.

The printer 3 receives the color information of CMYK or the K color from the image processing apparatus 1 and performs printing on a print medium such as a print sheet on the basis of the color information of CMYK or the K color.

Figure 2:
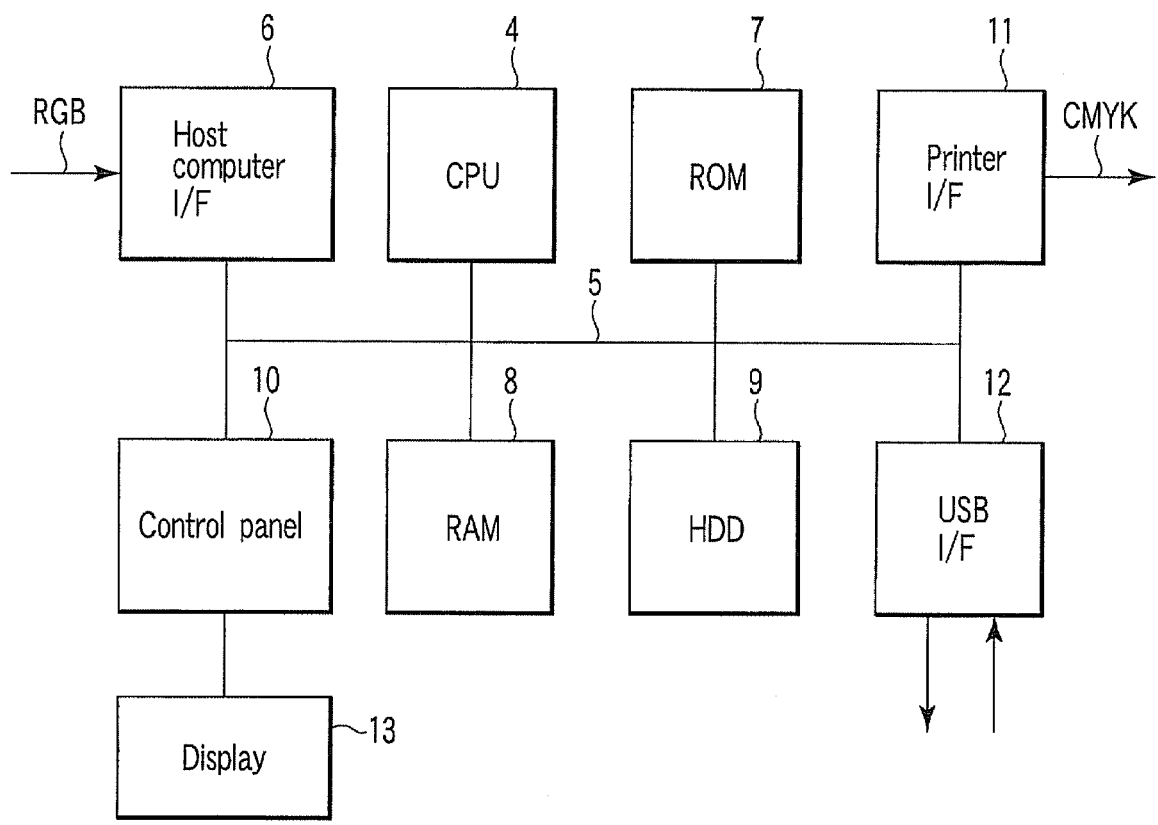
FIG. 2 is a diagram showing a hardware configuration of the apparatus.

FIG. 2 shows a diagram of hardware of the image processing apparatus 1. The image processing apparatus 1 is mounted with a CPU (Central Processing Unit) 4. To the CPU 4, a host computer I/F (interface) 6, a ROM 7, a RAM 8, an HDD (Hard Disk Drive) 9, a control panel 10, a printer I/F 11, and a USB I/F 12 are connected via a bus 5. The host computer I/F 6 captures an image signal of RGB from the host computer 2. The printer I/F 11 outputs the image signal of RGB to the printer 3. The control panel 10 includes a panel display 13. The panel display 13 includes, for example, a liquid crystal panel. In the panel display 13, a touch panel is provided on the liquid crystal panel.

A first color conversion path program and a second color conversion path program are stored in the ROM 7. The first color conversion path program converts an image signal of chromatic RGB received from the host computer 2 into, for example, color information in a CMYK color space, which is color material quantities for output by the printer 3, in accordance with color conversion data for chromatic colors. The second color conversion path program converts an image signal of achromatic color RGB received from the host computer 2 into, for example, color information of only a K color of the printer 3 in accordance with color conversion data for achromatic colors.

A color conversion data rewriting program of the image processing apparatus 1 is stored in the ROM 7. The color conversion data rewriting program updates, when the color conversion data for chromatic colors or the color conversion data for achromatic colors is rewritten, attribute information of the color conversion data for chromatic colors or the color conversion data for achromatic colors, reads out the attribute information of the color conversion data for chromatic colors or the color conversion data for achromatic colors, and displays the attribute information on, for example, the panel display 13 of the control panel 10.

FIG. 3 shows a flow of image processing by the image processing apparatus 1. The image processing apparatus 1 has an input image database 20, a first color conversion database 21, a second color conversion database 22, a pure gray database 23, and an output image database 24.

The input image database 20 stores plural image signals formed by mixing image signals of chromatic RGB received from the host computer 2 and image signals of achromatic RGB received from the host computer 2. One image signal formed by mixing an image signal of chromatic RGB and an image signal of achromatic RGB stored in the input image database 20 is hereinafter referred to as input image signal.

The first color conversion database 21 stores first color conversion data. The first color conversion database 21 is stored in, for example, the HDD 9. The first color conversion data describes a relation of colors between a color space corresponding to an image signal of RGB and a device-independent color space. The device-independent color space is a color space that is not dependent on the printer 3 as a device.

The first color conversion data is stored in the first color conversion database 21 in a form of a table of a relation between RGB values and CIELAB values. The CIELAB values are determined in the Commission Internationale de l'Eclairage. A CIELAB color space (an L*a*b* color space) is one of uniform color spaces used for representing a color difference between two object colors having different luminances. The relation between RGB values and CIELAB values is determined in advance by measurement in some cases and determined in advance as a standard in other cases. In this apparatus, the relation between RGB values and CIELAB values does not need to be determined in advance and is transmitted together with an image signal transmitted from the host computer 2.

A first color conversion unit 25 performs interpolation arithmetic processing in accordance with the first color conversion data stored in the first color conversion database 21 and converts an input image signal of RGB into color information in a device-independent color space. The first color converting unit 25 converts, for example, an input image signal of RGB values into an image signal of CIELAB values. The first color converting unit 25 converts, for example, an input image signal of achromatic RGB into image signal of CIELAB values.

An achromatic-color determining unit 26 determines whether an input image signal is a chromatic color or an achromatic color. When the input image signal is a chromatic color as a result of the determination, the achromatic-color determining unit 26 transmits the input image signal to a second color converting unit 27. When the input image signal is an achromatic color, the achromatic-color determining unit 26 transmits the input image signal to a pure-gray converting unit 28.

The second color conversion database 22 stores plural second color conversion data, which are color conversion data for chromatic colors. The second color conversion database 22 is stored in, for example, the HDD 9. The second color conversion data is, for example, CLUT color conversion data. The CLUT color conversion data describes a relation between color material quantities of the printer 3 and, for example, CIELAB values as color information in a device-independent color space. The CLUT color conversion data indicates color material quantities of the printer 3, for example, color material quantities of CMYK with respect to points (grid points) arranged at equal intervals on a CIELAB color space. The CLUT color conversion data discretely indicates a relation between the grid points and the color material quantities of CMYK in a form of a table. The CLUT color conversion data is provided for each of profiles corresponding to, for example, a difference in a print medium, a difference in a halftone, and a difference in a print mode.

The second color converting unit 27 receives the image signal of chromatic CIELAB values color-converted by the first color converting unit 25 and converts the image signal of chromatic CIELAB values into CMYK values, which are color material quantities of the printer 3, in accordance with the CLUT color conversion data. In the processing for converting the image signal in accordance with the CLUT color conversion data, with respect to pixels Li, ai, and bi of the image signal of chromatic CIELAB values, eight table data surrounding the pixels in the CIELAB color space (the L*a*b* color space) are extracted. Respective i's of the pixels Li, ai, and bi represent input images. Respective o's of Co, Mo, Yo, and Ko represent conversion outputs. The second color converting unit 27 extracts L0,a0,b0: C0,M0,Y0, K0
L0,a0,b1: C1,M1,Y1, K1
L0,a1,b0: C2,M2,Y2, K2
L0,a1,b1: C3,M3,Y3, K3
L1,a0,b0: C4,M4,Y4, K4
L1,a0,b1: C5,M5,Y5, K5
L1,a1,b0: C6,M6,Y6, K6
L1,a1,b1: C7,M7,Y7, K7, where L0<Li<L1, a0<ai<a1, and b0<bi<b1, performs an interpolation operation by linear conversion described below according to the number of dimensions of a color space, and calculates color conversion outputs of Co, Mo, Yo, and Ko.

$$Co = C0 + (C1 - C0) * (bi - b0)/(b1 - b0) +$$
$$(C2 - C0) * (ai - a0)/(a1 - a0) + (C4 - C0) *$$
$$(Li - L0), /(L1 - L0) + (C3 - C2 - C1 + C0) *$$
$$(ai - a0)/(a1 - a0) * (bi - b0)/(bi - b0) +$$
$$(C5 - C4 - C1 + C0) * (Li - L0)/(L1 - L0) *$$
$$(bi - b0)/(b1 - b0) + (C6 - C4 - C2 + C0) *$$
$$(Li - L0)/(L1 - L0) * (ai - a0)/(a1 - a0) +$$
$$(C7 - C6 - C5 - C3 + C1 + C4 + C2 - C0) * (Li - L0)/$$
$$(L1 - L0) * (ai - a0)/(a1 - aG) * (bi - b0)/(b1 - b0)$$

$$Mo = M0 + (M1 - M0) * (bi - b0)/(b1 - b0) + (M2 - M0) *$$
$$(ai - a0)/(a1 - a0) + (M4 - M0) * (Li - L0), /$$
$$(L1 - L0) + (M3 - M2 - M1 + M0) *$$
$$(ai - a0)/(a1 - a0) * (bi - b0)/(bi - b0) +$$
$$(M5 - M4 - M1 + M0) * (Li - L0)/(L1 - L0) *$$
$$(bi - b0)/(b1 - b0) + (M6 - M4 - M2 + M0) *$$
$$(Li - L0)/(L1 - L0) * (ai - a0)/(a1 - a0) +$$
$$M7 - M6 - M5 - M3 + M1 + M4 + M2 - M0) *$$
$$(Li - L0)/(L1 - L0) * (ai - a0)/(a1 - aG) *$$
$$(bi - b0)/(b1 - b0)$$

$$Yo = Y0 + (Y1 - Y0) * (bi - b0)/(b1 - b0) + (Y2 - Y0) *$$
$$(ai - a0)/(a1 - a0) + (Y4 - Y0) * (Li - L0), /(L1 - L0) +$$
$$(Y3 - Y2 - Y1 + Y0) * (ai - a0)/(a1 - a0) *$$
$$(bi - b0)/(bi - b0) + (Y5 - Y4 - Y1 + Y0) *$$
$$(Li - L0)/(L1 - L0) * (bi - b0)/(b1 - b0) +$$
$$(Y6 - Y4 - Y2 + Y0) * (Li - L0)/(L1 - L0) *$$
$$(ai - a0)/(a1 - a0) + Y7 -$$
$$Y6 - Y5 - Y3 + Y1 + Y4 + Y2 - Y0) *$$
$$(Li - L0)/(L1 - L0) * (ai - a0)/(a1 - aG) *$$
$$(bi - b0)/(b1 - b0)$$

$$Ko = K0 + (K1 - K0) * (bi - b0)/(b1 - b0) + (K2 - K0) *$$
$$(ai - a0)/(a1 - a0) + (K4 - K0) * (Li - L0), /(L1 - L0) +$$
$$(K3 - K2 - K1 + K0) * (ai - a0)/(a1 - a0) * (bi - b0)/(bi - b0) +$$
$$(K5 - K4 - K1 + K0) * (Li - L0)/(L1 - L0) * (bi - b0)/(b1 - b0) +$$

-continued
$$(K6 - K4 - K2 + K0) * (Li - L0)/(L1 - L0) * (ai - a0)/(a1 - a0) +$$
$$K7 - K6 - K5 - K3 + K1 + K4 + K2 - K0) *$$
$$(Li - L0)/(L1 - L0) * (ai - a0)/(a1 - aG) *$$
$$(bi - b0)/(b1 - b0)$$

The pure gray database 23 stores plural pure gray data, which are color conversion data for achromatic colors. The pure gray database 23 is stored in, for example, the HDD 9. The pure gray data describes, for example, a value of a K quantity corresponding to brightness. As the pure gray data, for example, table values described below are created in advance by spline interpolation or the like from a brightness value corresponding to a K quantity at the time when all CMY quantities are "0" in combinations of CMYK quantities printed by the printer 3.

L* value: 0 10 20 30 40 50 60 70 80 90 100
K value: 255 242 220 189 158 127 98 80 52 22 0

In the table values of the pure gray data, the L* value (=0) represents deep black. The L* value (=100) represents pure white. Therefore, the K value (=255) represents full black with 8 bits. The K value (=0) represents full white with 8 bits.

The pure-gray converting unit 28 receives the image signal of achromatic CIELAB values color-converted by the first color converting unit 25 and converts the image signal of achromatic CIELAB values into only a K value, which is a color material quantity of the printer 3, in accordance with the pure gray data. The pure-gray converting unit 28 always keeps a C value, an M value, and a Y value at "0". In the color conversion, using the pure gray data, two brightness point data on both sides of the pixel Li of the image signal of achromatic CIELAB values are extracted from the pure gray data and these brightness point data are subjected to linear interpolation to calculate a K value corresponding to the pixel Li.

The output image database 24 stores CMYK values of the printer 3, which are a color conversion output by the second color converting unit 27, and a color material quantity value obtained by mixing CMYK values for always keeping CMY values of the printer 3 at "0", which are a color conversion output by the pure-gray converting unit 28. The CMYK values of the printer 3 and the color material quantity value obtained by mixing the CMYK values for always keeping CMY values of the printer 3 at "0", which are stored in the output image database 24, are transmitted to the printer 3.

In the flow of the image processing by the image processing apparatus 1 described above, a path passing the achromatic-color determining unit 26, the second color converting unit 27, and the output image database 24 from the first color converting unit 25 is a first color conversion path of a chromatic system. A path passing the achromatic-color determining unit 26, the pure-gray converting unit 28, and the output image database 24 from the first color converting unit 25 is a second color conversion path of an achromatic system.

FIG. 4 shows functions of the flow of the image processing by the image processing apparatus 1 shown in FIG. 3 in a form of blocks. Components identical with those in FIG. 3 are denoted by the identical reference numerals. An image-data receiving unit 30 receives an image signal of chromatic RGB transmitted from the host computer 2 and an image signal formed by mixing an image signal of achromatic RGB. The image-data receiving unit 30 receives a relation between RGB values and CIELAB values transmitted together with the image signals transmitted from the host computer 2.

The first color converting unit 25 performs interpolation arithmetic processing in accordance with the first color conversion data stored in the first color conversion database 21 and converts the input image signal of RGB received by the image-data receiving unit 30 into an image signal of CIELAB values.

A color-conversion-data designating unit 31 reads incidental information of the input image signal of RGB received by the image-data receiving unit 30 and designates, from this incidental information, CLUT color conversion data corresponding to chromatic colors and pure gray data corresponding to achromatic colors.

The incidental information of the input image signal is designation of a difference in a print medium such as a print sheet, a difference in a halftone, a difference in a print mode, and the like. The color-conversion-data designating unit 31 indicates the designated CLUT color conversion data or pure gray data to the second color converting unit 27.

A color-conversion-data holding unit 32 has the second color conversion database 22 and the pure gray database 23.

A main-color converting unit 33 has the achromatic-color determining unit 26, the second color converting unit 27, and the pure-gray converting unit 28.

An image-data output unit 34 transmits the CMYK values of the printer 3 and the color material quantity value obtained by mixing the CMYK values for always keeping CMY values of the printer 3 at "0", which are stored in the output image database 24, to the printer 3.

A color-conversion-data input and output unit 35 performs rewriting of CLUT color conversion data stored in the second color conversion database 22 and rewriting of pure gray data stored in the pure gray database 23 from an external apparatus. Rewritten contents of the CLUT color conversion data or the pure gray data are, for example, one or both of hue data and brightness data.

The rewriting of the CLUT color conversion data stored in the second color conversion database 22 and the pure gray data stored in the pure gray database 23 is performed through, for example, the USB I/F 12. For the rewriting of these data, other I/Fs of IEEE 1394 and the like may be used instead of the USB I/F 12.

The color-conversion-data input and output unit 35 updates attribute information of the CLUT color conversion data or the pure gray data when the CLUT color conversion data or the pure gray data is rewritten. Each of the pieces of attribute information of the CLUT color conversion data and the pure gray data has a person who rewrote the CLUT color conversion data or the pure gray data, a rewriting date, and an authentication number of the person who rewrote the data. The color-conversion-data input and output unit 35 is, for example, the USB I/F 12. As the color-conversion-data input and output unit 35, other I/Fs of IEEE 1394 and the like may be used instead of the USB I/F 12 as described above.

A user instruction unit 36 includes, for example, ten keys on the control panel 10 as an operation terminal and two buttons for execution and cancellation. The user instruction unit 36 receives, for example, operation of the user applied to the ten keys or the buttons on the control panel 10. The operation of the user is rewriting of the CLUT color conversion data or the pure gray data as a first operation instruction and readout of the attribute information of the CLUT color conversion data or the pure gray data as a second operation instruction. When both the two buttons for execution and cancellation are set on by the operation of the user, this is an instruction for shift to a test mode.

When a data display unit 37 receives an instruction for readout of the attribute information of the CLUT color conversion data or the pure gray data from the user instruction unit 36, the data display unit 37 reads out the attribute information of the CLUT color conversion data stored in the second color conversion database 22 or the attribute information of the pure gray data stored in the pure gray database 23. The data display unit 37 displays the read-out attribute information of the CLUT color conversion data or attribute information of the pure gray data on the panel display 13 on the control panel 10.

The data display unit 37 performs, during the test mode, rewriting of the CLUT color conversion data or the pure gray data, update of the attribute information, or display of the attribute information on the panel display 13.

Figures 5, 6:
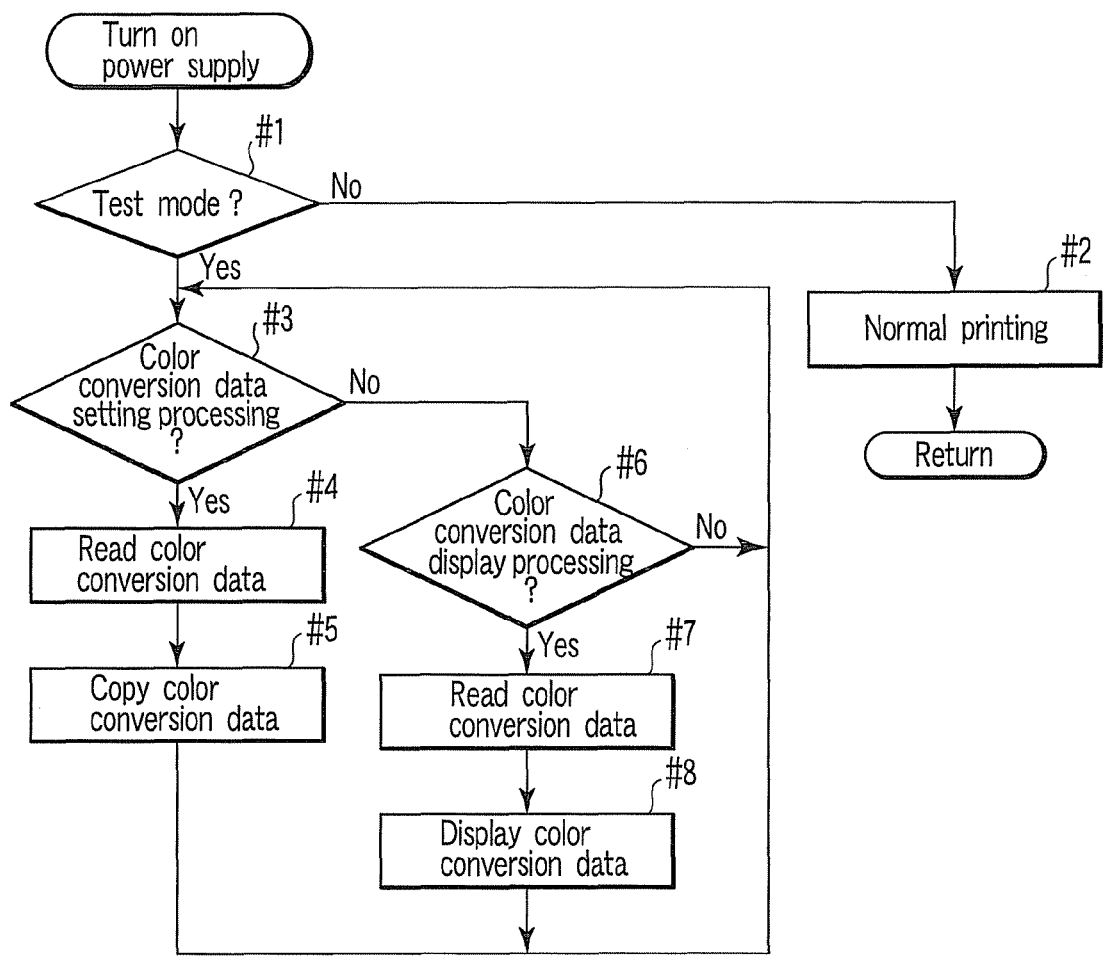
FIG. 5 is an image processing flowchart in the apparatus.
FIG. 6 shows an example of display of attribute information of CLUT color conversion data and pure gray data by the apparatus.
Figure 7:
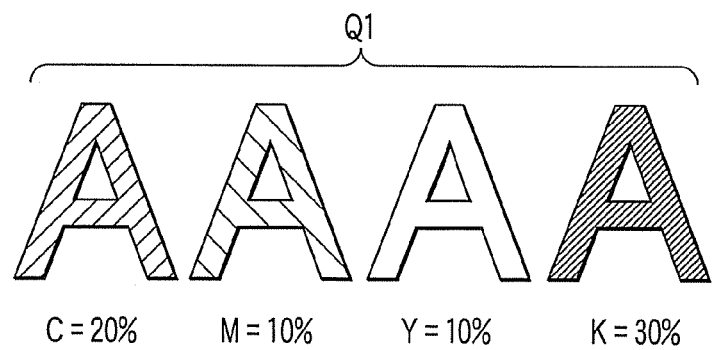
FIG. 7 is a diagram showing a color conversion result obtained by a first color conversion path when an image signal of a character "A" with 50% achromatic colors is inputted.
Figure 8:
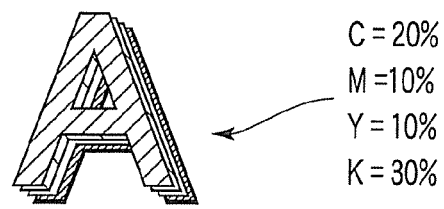
FIG. 8 is a diagram showing deviation of respective print positions of respective colors CMYK.
Figure 9:
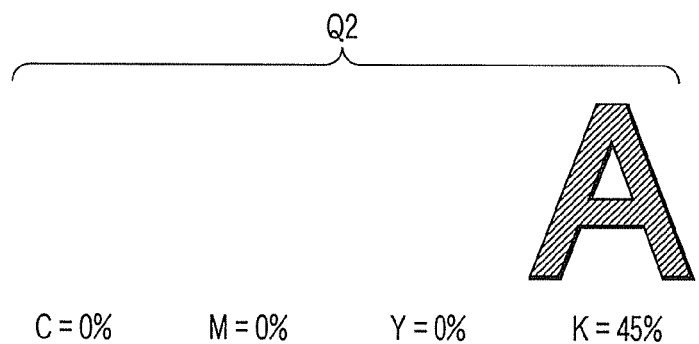
FIG. 9 is a diagram showing a color conversion result obtained by a second color conversion path when the image signal of the character "A" with 50% achromatic colors is inputted.
Figure 10:
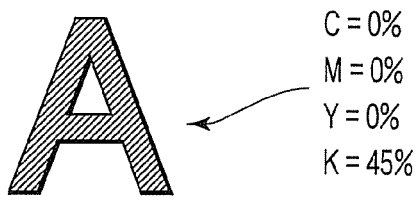
FIG. 10 is a diagram showing a print result of only a K color.

Next, image processing of the apparatus constituted as described above is explained in accordance with an image processing flowchart shown in FIG. 5.

When a power supply is turned on, in step #1, the CPU 4 determines whether the image processing apparatus is in the test mode. The CPU 4 determines whether both the two buttons on the control panel 10 are on. When both the two buttons are not on, the CPU 4 determines that the image processing apparatus is in a normal print mode. When both the two buttons are on, the CPU 4 determines that the image processing apparatus is in the test mode. As a result of the determination, when both the two buttons are not on, the CPU 4 shifts to step #2 and executes the normal print mode.

In the normal print mode, the host computer 2 transmits, for example, an image signal of RGB. The image-data receiving unit 30 receives the image signal of RGB transmitted from the host computer 2 and receives CLUT color conversion data indicating a relation between RGB values and CIELAB values. The CLUT color conversion data is stored in the second color conversion database 22 by the CPU 4.

Next, the first color converting unit 25 performs interpolation arithmetic processing in accordance with the first color conversion data stored in the first color conversion database 21 and converts the input image signal of RGB received by the image-data receiving unit 30 into an image signal of CIELAB values.

Simultaneously with this, the color-conversion-data designating unit 31 reads incidental information of the input image signal of RGB received by the image-data receiving unit 30. The color-conversion-data designating unit 31 designates, from the incidental information, the CLUT color conversion data for a profile corresponding to a difference in a print medium such as a print sheet, a difference in a halftone, a difference in a print mode, and the like and indicates the designation of the CLUT color conversion data to the main-color converting unit 33.

Next, the achromatic-color determining unit 26 in the main-color converting unit 33 determines whether the input image signal is a chromatic color or an achromatic color. When the input image signal is a chromatic color, the main-color converting unit 33 transmits the input image signal converted into the CIELAB values to the second color converting unit 27.

The second color converting unit 27 receives the image signal of chromatic CIELAB values color-converted by the first color converting unit 25 and converts the image signal of chromatic CIELAB values into CMYK values, which are color material quantities of the printer 3, in accordance with the CLUT color conversion data as explained above. The CMYK values, which are color material quantities of the printer 3, are temporarily stored in the output database 24.

When the achromatic-color determining unit 26 in the main-color converting unit 33 determines that the input image signal is an achromatic color, the main-color converting unit 33 transmits the input image signal converted into the CIELAB values to the pure-gray converting unit 28.

The pure-gray converting unit 28 receives the image signal of achromatic CIELAB values color-converted by the first color converting unit 25 and converts the image signal of CIELAB values into only a K value, which is a color material quantity of the printer 3, in accordance with the pure gray data as explained above. CMYK values for always keeping CMY values, which are color material quantities of the printer 3, at "0" are temporarily stored in the output database 24.

Next, the image-data output unit 34 transmits the CMYK values of the printer 3 and the color material quantity value obtained by mixing the CMYK values for keeping CMY values of the printer 3 at "0", which are stored in the output image database 24, to the printer 3. The printer 3 prints an image on a print medium in accordance with the color material quantity values.

On the other hand, when the power supply is turned on, the CPU 4, in step #1, determines that the image processing apparatus is in the test mode when both the two buttons on the control panel 10 are on. When it is determined that the image processing apparatus is in the test mode, the CPU 4 shifts to step #3 and determines whether rewriting of the CLUT color conversion data or the pure gray data is performed or display of the attribute information of the CLUT color conversion data or the pure gray data on the panel display 13 is performed.

Here, the user operates the ten keys on the control panel 10 and inputs, for example, a four-digit code as code information, whereby a profile of the CLUT color conversion data or the pure gray data that is rewritten or the attribute information of which is displayed is designated. For example, first two digits of a four-digit code "0000" are a processing code for performing rewriting or display. Last two digits of the four-digit code are designation of a profile. For example, when first two digits of a four-digit code are "00", the first two digits represent rewriting. When the first two digits are "01", the first two digits represent display. Last two digits "00" represent a file name. Therefore, for example, the four-digit code "0000" represents rewriting of a profile with the file name "00". A four-digit code "0100" represents display of attribute information of the profile with the file name "00".

When, for example, a code of "00" is inputted in first two digits from the ten keys on the control panel 10 by operation of the user, in steps #4 and #5, the color-conversion-data input and output unit 35 performs, for example, rewriting of the CLUT color conversion data stored in the second color conversion database 22 of the color-conversion-data holding unit 32 from an external apparatus through the USB I/F 12 or the pure gray data stored in the pure gray database 23. Rewritten contents of the CLUT color conversion data or the pure gray data are, for example, one or both of hue data and brightness data.

CLUT color conversion data of plural profiles are stored in the second color conversion database 22. The profiles including the CLUT color conversion data have, for example, file names of "00.icc", respectively. Attribute information of these CLUT color conversion data is embedded in, for example, private tags of the profiles in advance as text data. The attribute information has a person who rewrote the CLUT color conversion data (Creator), a rewriting date (Creation Date), and an authentication number (IDcode) of the person who rewrote the data.

When the CLUT color conversion data is rewritten, the color-conversion-data input and output unit 35 updates the person who rewrote the CLUT color conversion data, the rewriting date, and the authentication number of the person who rewrote the data, which are the attribute information of the CLUT color conversion data.

On the other hand, pure gray data of plural profiles are stored in the pure gray database 23. The profiles of the pure gray data have, for example, file names of "00.bal", respectively. Attribute information of these pure gray data is embedded in advance in, for example, a text format. The attribute information has a person who rewrote the pure gray data, a rewriting date, and an authentication number of the person who rewrote the data.

When the pure gray data is rewritten, the color-conversion-data input and output unit 35 updates the person who rewrote the pure gray data, the rewriting date, and the authentication number of the person who rewrote the pure gray data, which are the attribute information of the data.

When, for example, a four-digit code "0000" is inputted from the ten keys on the control panel 10 by operation of the user, in step #4, the color-conversion-data input and output unit 35 reads, for example, CLUT color conversion data of a profile with a file name "00.icc". In step #5, the color-conversion-data input and output unit 35 stores the CLUT color conversion data of the profile with the file name "00.icc" in the second color conversion database 22.

Simultaneously with this, when the four-digit code "0000" is inputted from the ten keys on the control panel 10 by operation of the user, in step #4, the color-conversion-data input and output unit 35 reads, for example, pure gray data of a profile with a file name "00.bal". In step #5, the color-conversion-data input and output unit 35 stores the pure gray data of the profile with the file name "00.bal" in the pure gray database 23.

When a four-digit code "0001" is inputted from the ten keys on the control panel 10 by operation of the user, in step #4, the color-conversion-data input and output unit 35 reads, for example, CLUT color conversion data of a profile with a file name "01.icc". In step #5, the color-conversion-data input and output unit 35 stores the CLUT color conversion data of the profile with the file name "01.icc" in the second color conversion database 22.

Simultaneously with this, when the four-digit code "0001" is inputted from the ten keys on the control panel 10 by operation of the user, in step #4, the color-conversion-data input and output unit 35 reads, for example, pure gray data of a profile with a file name "01.bal". In step #5, the color-conversion-data input and output unit 35 stores the pure gray data of the profile with the file name "01.bal" in the pure gray database 23.

When a four-digit code "0100" is inputted from the ten keys on the control panel 10 by operation of the user, in step #6, the data display unit 37 determines, from the four-digit code, whether attribute information of the CLUT color conversion data or the pure gray data is displayed. Since the four-digit code "0100" is inputted from the ten keys, first two digits of the code is "01". Therefore, the data display unit 37 determines attribute information of the CLUT color conversion data is displayed.

Next, in step #7, the data display unit 37 reads out, for example, attribute information of the CLUT color conversion data of the profile with the file name "00.icc" from the second color conversion database 22. In step #8, the data display unit 37 displays the attribute information of the CLUT color conversion data of the profile with the file name "00.icc" on the panel display 13.

Simultaneously with this, when the four-digit code "0100" is inputted from the ten keys on the control panel 10 by operation of the user, since first two digits of the four-digit code "0100" is "01", in step #6, the data display unit 37 determines that attribute information of the pure gray data is also displayed.

Next, in step #7, the data display unit 37 reads out, for example, attribute information of the pure gray data of the profile with the file name "00.bal" from the pure gray database 23. In step #8, the data display unit 37 displays the attribute information of the pure gray data of the profile with the file name "00.bal" on the panel display 13.

Consequently, the attribute information of the CLUT color conversion data of the profile with the file name "00.icc" and the attribute information of the pure gray data of the profile with the file name "00.bal" are simultaneously displayed on the panel display 13.

FIG. 6 shows an example of display of the attribute information of the CLUT color conversion data of the profile with the file name "00.icc" and the attribute information of the pure gray data of the profile with the file name "00.bal" displayed on the panel display 13. As the attribute information, persons who rewrote the CLUT color conversion data and the pure gray data (Creator), rewriting dates (Creation Date), and authentication numbers of the persons who rewrote the data (IDcode) are displayed.

When a four-digit code "0101" is inputted from the ten keys on the control panel 10 by operation of the user, in step #6, the data display unit 37 determines, from the four-digit code, whether attribute information of the CLUT color conversion data or the pure gray data is displayed. Here, since the four-digit code "0101" is inputted from the ten keys, first two digits of the code are "01". Therefore, the data display unit 37 determines that attribute information of the CLUT color conversion data is displayed.

Next, in step #7, the data display unit 37 reads out, for example, attribute information of the CLUT color conversion data of the profile with the file name "01.icc" from the second color conversion database 22. In step #8, the data display unit 37 displays the attribute information of the CLUT color conversion data of the profile with the file name "01.icc" on the panel display 13.

Simultaneously with this, when the four-digit code "0101" is inputted from the ten keys on the control panel 10 by operation of the user, in step #6, since first two digits of the four-digit code "0101" are "01", the data display unit 37 determines that attribute information of the pure gray data is also displayed.

Next, in step #7, the data display unit 37 reads out, for example, attribute information of the pure gray data of the profile with the file name "01.bal" from the pure gray database 23. In step #8, the data display unit 37 displays the attribute information of the pure gray data of the profile with the file name "01.bal" on the panel display 13.

Consequently, as shown in FIG. 6, the attribute information of the CLUT color conversion data of the profile with the file name "01.icc" and the attribute information of the pure gray data of the profile with the file name "01.bal" are simultaneously displayed on the panel display 13.

When the attribute information of the CLUT color conversion data of the profile with the file name "01.icc" and the attribute information of the pure gray data of the profile with the file name "01.bal" are displayed on the panel display 13, the data display unit 37 changes a display color of a display screen in the panel display 13. For example, the data display unit 37 changes the entire display screen in the panel display 13, for example, from normal white to red, orange, or the like.

The display color of the display screen in the panel display 13 is selectable from plural display colors. The data display unit 37 may change a display color of characters themselves of the persons who rewrote the CLUT color conversion data and the pure gray data, the rewriting dates, and the authentication numbers of the persons who rewrote the data.

As described above, according to the embodiment, the attribute information such as the person who rewrote the CLUT color conversion data, the rewriting date, and the authentication number of the person who rewrote the data and the attribute information such as the person who rewrote the pure gray data, the rewriting date, and the authentication number of the person who rewrote the data are displayed on the panel display 13. Consequently, the user understands that one or both of the CLUT color conversion data and the pure gray data are rewritten. Since the pieces of the CLUT color conversion data and the pure gray data are displayed on the panel display 13, even if an image and the like are not actually printed on a print medium, the user understands that one or both of the CLUT color conversion data and the pure gray data are rewritten.

The user requests a favorite hue and brightness with respect to a print result. The user adjusts the CLUT color conversion data in order to obtain a print result of the hue and the brightness corresponding to the request. When only the CLUT color conversion data is adjusted, it is likely that a large difference occurs between brightness of a color conversion result according to the CLUT color conversion data and brightness of a color conversion result according to the pure gray data.

According to the embodiment described above, since the user understands that one or both of the CLUT color conversion data and the pure gray data are rewritten, the user can simultaneously adjust the CLUT color conversion data and the pure gray data. The user can manage and adjust the CLUT color conversion data and the pure gray data as a pair. Consequently, a large difference does not occur between the brightness of the color conversion result according to the CLUT color conversion data and the brightness of the color conversion result according to the pure gray data.

When the attribute information of the CLUT color conversion data and the attribute information of the pure gray data are displayed, a display color of the display screen in the panel display 13 is changed. Consequently, the user visually understands easily that the CLUT color conversion data or the pure gray data is rewritten.

Note that the present invention is not limited to the embodiment described above and may be modified as described below.

The attribute information of the CLUT color conversion data and the attribute information of the pure gray data are not limited to be simultaneously displayed on the display panel 13. Any one of the attribute information of the CLUT color conversion data and the attribute information of the pure gray data may be displayed on the panel display 13.

In the explanation of the color conversion, the CLUT color conversion data and the pure gray data are used. However, the color conversion is also applicable when other color conversion data are used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a color converting unit configured to hold color conversion data describing at least a relation between an image signal and color information represented by color materials and convert the image signal into the color information in accordance with the color conversion data,
the color conversion data being added with attribute information including information concerning rewriting of the color conversion data;
a display; and
a color-conversion-data rewriting unit configured to perform rewriting of the color conversion data, update the attribute information when the color conversion data is rewritten, and read out the attribute information of the color conversion data and display the attribute information on the display.

2. An image processing apparatus according to claim 1, wherein the attribute information has at least a person who rewrote the color conversion data and a rewriting date.

3. An image processing apparatus according to claim 1, wherein the color-conversion-data rewriting unit rewrites one or both of hue data and brightness data in the color conversion data.

4. An image processing apparatus according to claim 1, wherein the color-conversion-data rewriting unit includes: a storing unit configured to store the color conversion data; and an operation terminal that receives a first operation instruction for rewriting the color conversion data and storing the color conversion data in the storing unit and a second operation instruction for reading out the attribute information from the storing unit and causing the display to display the attribute information.

5. An image processing apparatus according to claim 4, wherein the operation terminal has ten keys.

6. An image processing apparatus according to claim 4, where in the first operation instruction and the second operation instruction have pieces of code information set in advance, respectively, and the color-conversion-data rewriting unit stores, when the code corresponding to the first operation instruction is inputted from the operation terminal, the color conversion data to be rewritten in the storing unit and reads out, when the code corresponding to the second operation instruction is inputted from the operation terminal, the attribute information of the color conversion data stored in the storing unit and displays the attribute information on the display.

7. An image processing apparatus according to claim 6, where in each of the pieces of code information is represented by a four-digit code, and the four-digit code represents, with first two digits, storage of the color conversion data in the storing unit or display of the attribute information on the display and represents, with last two digits, a file name of the color conversion data.

8. An image processing apparatus according to claim 1, wherein the color-conversion-data rewriting unit performs, during a test mode, rewriting of the color conversion data, update of the attribute information, or display of the attribute information on the display.

9. An image processing apparatus according to claim 1, wherein the color-conversion-data rewriting unit changes a display color and performs display of the attribute information on the display.

10. An image processing apparatus comprising:
an achromatic-color determining unit configured to determine whether an image signal is a chromatic color having a color or an achromatic color without the color;
a chromatic-color-system converting unit configured to hold color conversion data for chromatic colors describing a relation between the image signal and color information represented by color materials and convert, when it is determined that the image signal is the chromatic color, the image signal into the color information represented by the color materials in accordance with the color conversion data for chromatic colors;
an achromatic-color-system converting unit configured to hold color conversion data for achromatic colors describing a relation between the image signal and color information of a specific color and convert, when it is determined that the image signal is the achromatic color, the image signal into the color information of the specific color in accordance with the color conversion data for achromatic colors,
the color conversion data for chromatic colors and the color conversion data for achromatic colors being added with pieces of attribute information including information concerning rewriting of the color conversion data, respectively;
a display; and
a color-conversion-data rewriting unit configured to perform rewriting of one or both of the color conversion data for chromatic colors and the color conversion data for achromatic colors, update the attribute information when the color conversion data for chromatic colors or the color conversion data for achromatic colors is rewritten, and read out the attribute information of one or both of the color conversion data for chromatic colors and the color conversion data for achromatic colors and display the attribute information on the display.

11. An image processing apparatus according to claim 10, wherein the attribute information has at least a person who rewrote the color conversion data and a rewriting date.

12. An image processing apparatus according to claim 10, wherein the color-conversion-data rewriting unit rewrites one or both of hue data and brightness data in the color conversion data for chromatic colors or brightness data in the color conversion data for achromatic colors.

13. An image processing apparatus according to claim 10, wherein the color-conversion-data rewriting unit rewrites the brightness data in the color conversion data for chromatic colors and the brightness data in the color conversion data for achromatic colors to be identical.

14. An image processing apparatus according to claim 10, wherein the color-conversion-data rewriting unit includes:
a first storing unit configured to store the color conversion data for chromatic colors;
a second storing unit configured to store the color conversion data for achromatic colors; and
an operation terminal that receives a first operation instruction for rewriting the conversion data for chromatic colors and storing the conversion data for chromatic colors in the first storing unit or rewriting the conversion data for achromatic colors and storing the conversion data for achromatic colors in the second storing unit and a second operation instruction for reading out the attribute information of the color conversion data for chromatic colors from the first storing unit and causing the display to display the attribute information or reading out the attribute information of the color conversion data for achromatic colors from the second storing unit and causing the display to display the attribute information.

15. An image processing apparatus according to claim 14, wherein the operation terminal has ten keys.

16. An image processing apparatus according to claim 14, wherein
the first operation instruction and the second operation instruction have pieces of code information set in advance, respectively, and
the color-conversion-data rewriting unit stores, when the code corresponding to the first operation instruction is inputted from the operation terminal, the color conversion data for chromatic colors to be rewritten in the first storing unit or stores the color conversion data for achromatic colors to be rewritten in the second storing unit and reads out, when the code corresponding to the second operation instruction is inputted from the operation terminal, the attribute information of the color conversion data for chromatic colors stored in the first storing unit and displays the attribute information on the display or reads out the attribute information of the color conversion data for achromatic colors stored in the second storing unit and displays the attribute information on the display.

17. An image processing apparatus according to claim 16, wherein
each of the pieces of code information is represented by a four-digit code, and
the four-digit code represents, with first two digits, storage of the color conversion data in the storing unit or display of the attribute information on the display and represents, with last two digits, a file name of the color conversion data.

18. An image processing apparatus according to claim 10, wherein the color-conversion-data rewriting unit performs, during a test mode, rewriting of the color conversion data, update of the attribute information, or display of the attribute information on the display.

19. An image processing apparatus according to claim 10, wherein the color-conversion-data rewriting unit changes a display color and performs display of the attribute information on the display.

20. An image processing apparatus according to claim 10, wherein
the image signal has red, green, and blue, and
the chromatic-color-system converting unit converts the image signal into color information of cyan, magenta, yellow, and black.

21. An image processing apparatus according to claim 10, wherein
the image signal has an achromatic color, and
the achromatic-color-system converting unit converts the image signal into color information of black.

22. An image processing method comprising:
holding color conversion data describing at least a relation between an image signal and color information represented by color materials;
converting the image signal into the color information in accordance with the color conversion data;
adding attribute information including information concerning rewriting of the color conversion data to the color conversion data; and
performing, in rewriting the color conversion data, rewriting of the color conversion data, updating the attribute information when the color conversion data is rewritten, and reading out the attribute information of the color conversion data and displaying the attribute information on the display.

23. An image processing method according to claim 22, further comprising displaying a person who rewrote the color conversion data, a rewriting date, and an authentication number of the person who rewrote the data included in the attribute information on the display.

24. An image processing method according to claim 22, further comprising rewriting one or both of hue data and brightness data in the color conversion data.

25. An image processing method according to claim 22, wherein
a storing unit that stores the color conversion data is provided, and
the image processing method includes storing the color conversion data to be rewritten in the storing unit in response to a first operation instruction and reading out the attribute information of the color conversion data stored in the storing unit and displaying the attribute information on the display in response to a second operation instruction.

26. An image processing apparatus according to claim 22, further comprising changing a display color and performing display of the attribute information on the display.

27. An image processing method comprising:
converting, when an image signal has a color, in accordance with color conversion data for chromatic colors describing a relation between the image signal and color information represented by color materials, the image signal into the color information represented by the color materials;
converting, when the image signal has an achromatic color, in accordance with color conversion data for achromatic colors describing a relation between the image signal and color information of a specific color, the image signal into the color information of the specific color,
the color conversion data for chromatic colors and the color conversion data for achromatic colors being added with pieces of attribute information including information concerning rewriting of the color conversion data, respectively; and
performing, when one or both of the color conversion data for chromatic colors and the color conversion data for achromatic colors are rewritten, rewriting of one or both of the color conversion data for chromatic colors and the color conversion data for achromatic colors, updating the attribute information when the color conversion data for chromatic colors or the color conversion data for achromatic colors is rewritten, reading out the attribute information of one or both of the color conversion data for chromatic colors and the color conversion data for achromatic colors, and displaying the attribute information on the display.

28. An image processing method according to claim 27, further comprising displaying at least a person who rewrote the color conversion data and a rewriting date included in the attribute information on the display.

29. An image processing method according to claim 27, further comprising rewriting one or both of hue data and brightness data in the color conversion data for chromatic colors or brightness data in the color conversion data for achromatic colors.

30. An image processing method according to claim 27, further comprising rewriting the brightness data in the color conversion data for chromatic colors and the brightness data in the color conversion data for achromatic colors to be identical.

31. An image processing method according to claim 27, wherein a first storing unit that stores the color conversion data for chromatic colors and a second storing unit that stores the color conversion data for achromatic colors are provided, and the image processing method further includes storing the color conversion data for chromatic colors to be rewritten in the first storing unit or storing the color conversion data for achromatic colors to be rewritten in the second storing unit in response to a first operation instruction and reading out the attribute information of the color conversion data for chromatic colors stored in the first storing unit and displaying the attribute information on the display or reading out the attribute information of the color conversion data for achromatic colors stored in the second storing unit and displaying the attribute information on the display in response to a second operation instruction.

32. An image processing method according to claim 27, further comprising changing a display color and performing display of the attribute information on the display.

33. A computer readable medium storing a color conversion data rewriting program for an image processing apparatus, comprising performing, in rewriting color conversion data describing at least a relation between an image signal and color information represented by color materials and added with attribute information including information concerning rewriting, rewriting of the color conversion data, updating the attribute information when the color conversion data is rewritten, and reading out the attribute information of the color conversion data and displaying the attribute information on the display.

34. A computer readable medium storing a color conversion data rewriting program for an image processing apparatus according to claim 33, further comprising displaying a person who rewrote the color conversion data, a rewriting date, and an authentication number of the person who rewrote the data included in the attribute information on the display.

35. A computer readable medium storing a color conversion data rewriting program for an image processing apparatus according to claim 33, further comprising determining whether the image processing apparatus is in a test mode, performing, when the image processing apparatus is in the test mode, rewriting of the color conversion data, update of the attribute information, or display of the attribute information on the display.

36. A computer readable medium storing a color conversion data rewriting program for an image processing apparatus according to claim 33, further comprising changing a display color and performing display of the attribute information on the display.

37. A computer readable medium storing a color conversion data rewriting program for an image processing apparatus, comprising:

performing, in rewriting color conversion data for chromatic colors describing at least a relation between an image signal and color information represented by color materials and added with attribute information including information concerning rewriting, rewriting of the color conversion data for chromatic colors, updating the attribute information when the color conversion data for chromatic colors is rewritten, and reading out the attribute information of the color conversion data for chromatic colors and displaying the attribute information on the display, and performing, in rewriting color conversion data for achromatic colors describing at least a relation between an image signal and color information of a specific color and added with attribute information including information concerning rewriting, rewriting of the color conversion data for achromatic colors, updating the attribute information when the color conversion data for achromatic colors is rewritten, and reading out the attribute information of the color conversion data for achromatic colors and displaying the attribute information on the display.

38. A computer readable medium storing a color conversion data rewriting program for an image processing apparatus according to claim 37, further comprising displaying a person who rewrote the color conversion data, a rewriting date, and an authentication number of the person who rewrote the data included in the attribute information on the display.

39. A computer readable medium storing a color conversion data rewriting program for an image processing apparatus according to claim 37, further comprising determining whether the image processing apparatus is in a test mode, performing, when the image processing apparatus is in the test mode, rewriting of the color conversion data for chromatic colors or the color conversion data for achromatic colors, update of the attribute information, or display of the attribute information on the display.

40. A computer readable medium storing a color conversion data rewriting program for an image processing apparatus according to claim 37, further comprising changing a display color and performing display of the attribute information on the display.

* * * * *